UNITED STATES PATENT OFFICE.

HENRY S. SPACKMAN, OF ARDMORE, AND EDWARD L. CONWELL, OF CHESTER, PENNSYLVANIA.

PROCESS OF RECOVERING ALKALI.

1,202,327.   Specification of Letters Patent.   Patented Oct. 24, 1916.

No Drawing.   Application filed March 15, 1916. Serial No. 84,465.

*To all whom it may concern:*

Be it known that we, HENRY S. SPACKMAN and EDWARD L. CONWELL, citizens of the United States, residing at 105 Ardmore avenue, Ardmore, and 616 East Fourteenth street, Chester, respectively, in the counties of Montgomery and Delaware, respectively, State of Pennsylvania, have invented certain new and useful Improvements in Processes of Recovering Alkali, of which the following is a specification.

Our invention relates to a process for recovering alkalis such as potash and soda, in water soluble form, from minerals containing alkali in insoluble form, and has for its principal object the production in and recovery from the dust and fumes of kilns used in making Portland or like cement of soluble salts of potassium, such as the sulfate.

We have found that this result can be obtained by providing for the presence, in the highly heated gaseous atmosphere of the kiln, of sulfurous gases and water vapor in quantities adequate to convert the volatilized alkali into a soluble sulfate.

Our process is preferably, but not necessarily, employed as an adjunct or addition to the well known method of manufacturing Portland cement in rotary kilns. It has long been known that the materials from which Portland cement is manufactured contain a percentage of alkalis such as soda or potash and that these alkalis are largely driven off at the clinkering temperature. It is also well known that the dust and fumes collected or condensed from cement kiln gases contain a considerable portion of alkali in insoluble form, due to the union of the volatilized alkalis with the highly heated, finely-divided, silicious dust to form glass.

It is the purpose of our invention to so carry out the usual cement-making process, that, while the manufacture of cement is in no way interfered with, these insoluble alkali compounds are largely transformed into soluble salts, preferably the sulfates, which can be recovered from the flue dust or flue gases by any of the methods well known in the art. If desired, the ratio of the lime to the alkali-bearing minerals may be modified or another non-volatile base can be substituted.

In carrying out the preferred form of our process we burn the cement material in the rotary kiln in the usual way, the kiln being heated by a flame produced by the injection of sulfur containing fuel, the natural sulfur content of fuels in common use being usually sufficient to furnish the requisite amount of acid-forming material to combine with the alkali volatilized or driven off from the clinker. The burning of the cement is preferably effected at a temperature and under such conditions as to volatilize or drive off from the clinker as great a proportion as possible of the alkali.

In order to increase the percentage of soluble alkalis in the dust or fumes we add to the products of combustion, water or steam to insure the presence, in the highly heated gaseous atmosphere of the kiln at the point of volatilization or decomposition of the alkali containing materials, of water vapor or gaseous water, in quantities adequate to promote the combination of the volatilized alkalis with the sulfurous gases of the kiln to form sulfates. The water may be introduced as steam with the fuel or may be introduced into the kiln in any other suitable manner.

In case the fuel is deficient in sulfur, it may be provided either by adding sulfur containing materials to the fuel or to the charge, or by introducing into the kiln sulfur fumes or sulfur dioxid gas. Other soluble alkaline salts than sulfates can be formed, such, for example, as chlorids, by the substitution for the sulfur of other acid forming material.

For example, potassium chlorid would be formed by injecting chlorin gas into the discharge end of the kiln; or by injecting into the kiln or onto the hot clinker at such point that the vapors driven off would enter the kiln, a mixture of water and hydrochloric acid; or some decomposable chlorin-containing material, such as calcium chlorid could be added to the kiln with the raw materials. Or, it may be possible to produce an alkaline phosphate by furnacing a mixture of feldspar, (containing silica, alumina and alkali), phosphate rock and lime. In case the production of cement were also desired, the proportions of lime, silica and alumina would be adjusted with that end in view.

The dust and fumes from the kiln are separated from the gases by any of the well known methods for cooling, condensing and collecting, and the soluble alkaline salts recovered by any of the well known leaching methods.

The reactions which occur in the kiln, resulting in the formation of soluble salts of potassium, are thought to be due to the addition of water vapor to the highly heated gaseous atmosphere of the kilns, the water vapor facilitating or causing reaction between the gaseous potassium compounds (probably potassium oxid) and the acid-forming gases, as these gases are reduced in temperature in their progress through the kiln.

We claim:—

1. The process of recovering soluble alkaline salts from alkali containing cement making materials, which consists in calcining such materials, at a temperature high enough to volatilize the alkali by acid-containing products of combustion, in the presence of water vapor in quantities adequate to cause the conversion of the major portion of the volatilized alkali into soluble salts and recovering said salts from the kiln gases.

2. The process of making water soluble the insoluble alkali compounds produced in ordinary cement burning operation, which consists in causing to be present in the clinkering zone of the kiln water vapor and acid forming gases in addition to the normal products of combustion.

3. The process of recovering soluble alkaline salts from alkali-containing cement raw mix, which consists in burning such raw mix at a temperature high enough to volatilize the alkali, by sulfur-containing fuels, in the presence of added water vapor in quantity sufficient to bring about the conversion of large proportions of the volatilized alkalis into soluble sulfates and recovering said sulfates from kiln gases.

4. The process of recovering soluble potash salts from alkali-containing cement raw mix, which consists in burning such raw mix at a temperature high enough to volatilize the potash, by sulfur-containing fuels, in the presence of added water vapor in quantity sufficient to bring about the conversion of large proportions of the volatilized potash into soluble sulfate and recovering said sulfate from kiln gases.

In testimony whereof, we affix our signatures.

HENRY S. SPACKMAN.
EDWARD L. CONWELL.